United States Patent
Oishi et al.

(10) Patent No.: US 9,658,516 B2
(45) Date of Patent: May 23, 2017

(54) BLADE DRIVE DEVICE AND OPTICAL APPARATUS

(71) Applicant: SEIKO Precision Inc., Matsudo-shi, Chiba (JP)

(72) Inventors: Seiichi Oishi, Matsudo (JP); Shoichi Tokura, Matsudo (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 14/976,816

(22) Filed: Dec. 21, 2015

(65) Prior Publication Data

US 2016/0195796 A1 Jul. 7, 2016

(30) Foreign Application Priority Data

Jan. 7, 2015 (JP) ................................. 2015-001749

(51) Int. Cl.
*G03B 9/40* (2006.01)

(52) U.S. Cl.
CPC ..................................... *G03B 9/40* (2013.01)

(58) Field of Classification Search
CPC ....................................................... G03B 9/40
See application file for complete search history.

(56) References Cited

U.S. PATENT DOCUMENTS

| 4,660,952 | A | * | 4/1987 | Toyoda | G03B 9/18 396/488 |
| 6,530,703 | B2 | * | 3/2003 | Nakano | G03B 9/18 396/456 |
| 2001/0028799 | A1 | * | 10/2001 | Nakagawa | G03B 9/40 396/484 |
| 2003/0161624 | A1 | * | 8/2003 | Toyoda | G03B 9/40 396/487 |
| 2015/0192836 | A1 | * | 7/2015 | Matsuda | G03B 9/40 396/488 |
| 2015/0268533 | A1 | * | 9/2015 | Oishii | G03B 9/36 396/471 |

FOREIGN PATENT DOCUMENTS

JP    2008-058400 A    3/2008

* cited by examiner

*Primary Examiner* — W B Perkey
(74) *Attorney, Agent, or Firm* — Brinks Gilson & Lione

(57) ABSTRACT

To provide a blade drive device capable of suppressing the increase in number of components while suppressing the bounding of blades, and an optical apparatus including the blade drive device. A blade drive device 10 includes a partition plate 21 having an opening 22, blades 31a to 34a, 31b to 34b which are expanded in a state where the opening 22 is closed and which overlap one another in a state where the opening 22 is opened, and a first regulating portion 23A and a second regulating portion 24A integrally formed with the partition plate 21, on which the blades 31a, 31b abut when being expanded. An optical apparatus includes the blade drive device 10.

14 Claims, 7 Drawing Sheets

BLADE DRIVE DEVICE AND OPTICAL APPARATUS

RELATED APPLICATIONS

This application claims priority under 35 U.S.C. §119 to Japanese Patent Application No. 2015-001749 filed on Jan. 7, 2015, the entire content of which is hereby incorporated by reference.

BACKGROUND OF THE INVENTION

1. Field of the Invention

The present invention relates to a blade drive device and an optical apparatus.

2. Description of Related Art

For example, a blade drive device having a driving member for driving blades is adopted in optical apparatuses such as a digital camera and a still camera.

The blade drive device moves blades between an expanded state and an overlapping state. As the blades run at high speed at this time, the blade drive device has a structure of including a cushioning member for stopping the blade by abutting on the blade at an end position of movement of the blade for suppressing the bounding of the blade at the time of abutting.

For example, a shutter device (corresponding to a "blade drive device" in claims) described in JP-A-2008-58400 (Patent Document 1) includes shutter blades (corresponding to "blades" in claims), a cushioning member provided for controlling the movement of the shutter blades and a blade contact member disposed between the shutter blades and the cushioning member and deformable independently of the cushioning member, in which the blade contact member is made of a material having a higher abrasion resistance than that of the cushioning member.

When the shutter device described in Patent Document 1 is used, it may be possible to suppress the bounding of the shutter blades at the end of running by using the cushioning member as well as suppress the generation of dust such as abrasion powder or fragments generated by the collision of the cushioning member and the shutter blades.

However, in the blade drive device described in Patent Document 1, the cushioning member and the blade contact member are provided as members for suppressing the bounding of the blade, therefore, the number of components as the blade drive device is increased. Accordingly, there is a problem in the related-art blade drive device in a point of suppressing the increase in number components while suppressing the bounding of the blade.

SUMMARY OF THE INVENTION

In view of the above, the present invention provides a blade drive device capable of suppressing the increase of the number of components while suppressing the bound of the blade and an optical apparatus having the blade drive device.

According to an embodiment of the present invention, there is provided a blade drive device including a partition plate having an opening, blades which are expanded in a state where the opening is closed and which overlap one another in a state where the opening is opened and regulating portions integrally formed with the partition plate, on which the blades abut when being expanded.

As the blades abut on the regulating portions at the time of expansion according to the present invention, it is possible to prevent the blades from overrunning and bounding at an end position of movement when the blades are expanded. Additionally, as the regulating portions are integrally formed with the partition plate, the above effects can be obtained without increasing the number of components. Therefore, the blade drive device capable of suppressing the increase in the number of components while suppressing bounding of the blades can be obtained.

In the above blade drive device, it is preferable that the regulating portions are provided to stand from the partition plate.

According to the embodiment, the regulating portions can be formed easily by, for example, cutting and raising the partition plate. Therefore, the blade drive device capable of suppressing the increase in the number of components while suppressing bounding of the blades can be manufactured easily.

The above blade drive device may further includes substrates disposed along the partition plate, in which guide holes into which the regulating portions are inserted are formed in the substrates, and gaps are provided between the regulating portions and the guide holes.

According to the embodiment, accurate positions of the regulating portions can be prescribed by inserting the regulating portions into the guide holes at the time of assembling the blade drive device, therefore, the assembling property can be improved. Additionally, as the gaps are provided between the regulating portions and the guide holes, the regulating portions are bent and deformed when the blades collide with the regulating portions. Accordingly, the impulsive force due to the collision of the blades can be efficiently absorbed. Therefore, the bounding of the blades can be positively suppressed.

In the above blade drive device, it is preferable that the blades correspond to a rear curtain.

Generally, the running speed of the blades in the rear curtain is faster than that in the front curtain in the transition from the overlapping state to the expanded state. The regulating portion is provided with respect to the rear curtain in which the running speed is faster and the blades tend to bound in the embodiment, therefore, the blade drive device in which the bounding of blades hardly occurs can be obtained.

In the above blade drive device, it is preferable that the hardness of the regulating portions is approximately the same as the hardness of the blades.

According to the present invention, the hardness of the regulating portions is approximately the same as that of the blades, therefore, generation of dust such as abrasion powder or fragments can be suppressed when respective regulating portions abut on the blades.

In the blade drive device, it is preferable that regulating portions have cushioning members in side surfaces which are the opposite side of the blades.

According to the present invention, the impulsive force due to the collision of the blades can be sufficiently absorbed by the cushioning members when the blades abut on the regulating portions. Additionally, the blades do not directly contact the cushioning members, it is possible to suppress the generation of dust such as abrasion powder or fragments caused by the cushioning members. Therefore, the bounding of the blades can be positively suppressed while suppressing the generation of the dust.

According to the embodiment of the present invention, there is provided an optical apparatus including the above blade drive device.

According to the present invention, the optical apparatus capable of suppressing the bounding of the blades as well as suppressing the increase in the number of components can be obtained.

As the blades abut on the regulating portions at the time of expansion according to the present invention, it is possible to prevent the blades from overrunning and bounding at the end position of movement when the blades are expanded. Additionally, as the regulating portions are integrally formed with the partition plate, the above effects can be obtained without increasing the number of components. Therefore, the blade drive device capable of suppressing the increase in the number of components while suppressing the bounding of the blades can be obtained.

DETAILED DESCRIPTION OF THE PREFERRED EMBODIMENTS

Figure 1:
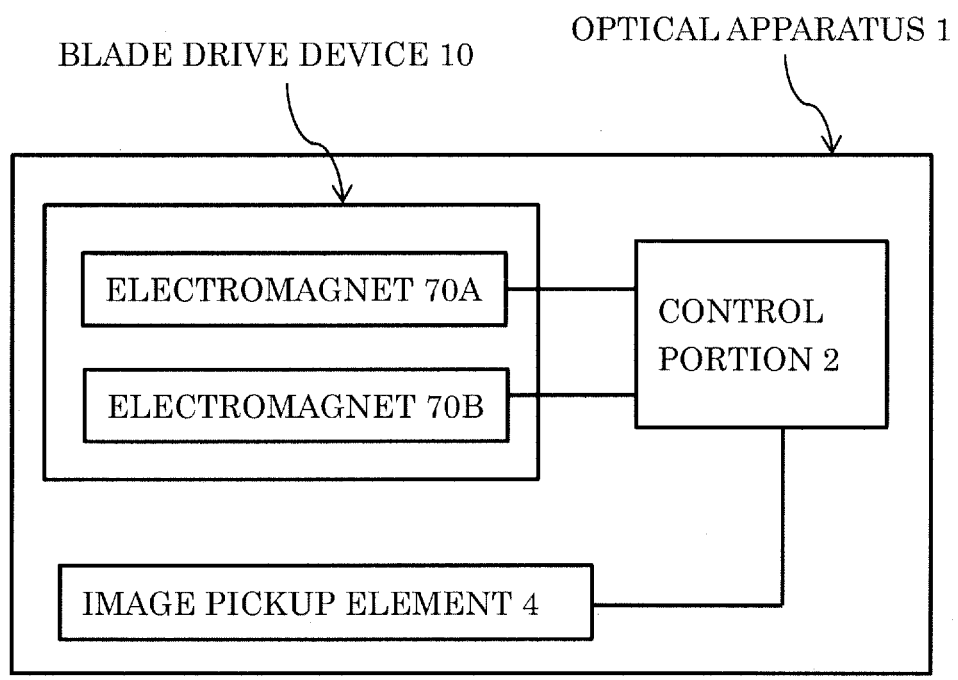
FIG. 1 is a block diagram of an optical apparatus.

Hereinafter, an embodiment of the present invention will be explained with reference to the drawings.
(Optical Apparatus)
FIG. 1 is a block diagram of an optical apparatus.
As shown in FIG. 1, an optical apparatus 1 is, for example, a digital camera, a still camera and so on, including a controller 2, an imaging device 4 and a blade drive device 10.

The controller 2 controls the entire operation of the optical apparatus 1, which includes a CPU (Central Processing Unit), ROM (Read Only Memory), RAM (Random Access Memory) and so on. The controller 2 controls the operation of the later-described blade drive device 10.

The imaging device 4 is, for example, a CCD (Charge Coupled Device) image sensor, a CMOS (Complementary Metal Oxide Semiconductor) image sensor or the like, which converts an object image formed by light into an electrical signal.

Figure 2:
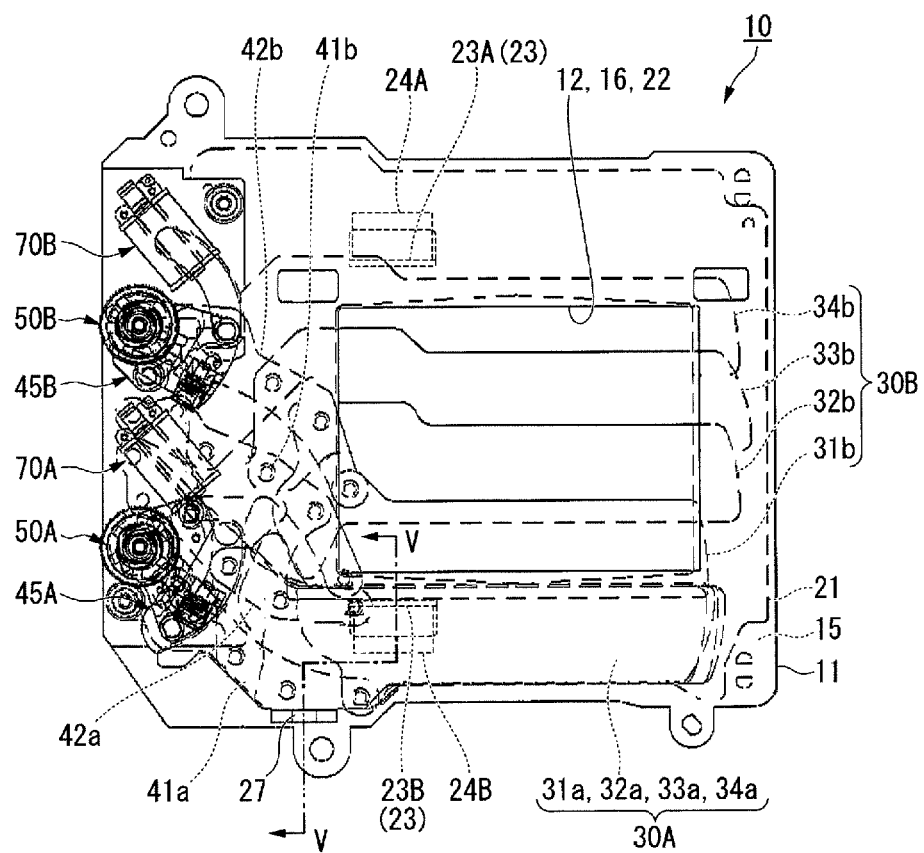
FIG. 2 is a front view of a blade drive device, showing a state just after an exposure is completed.
Figure 3:
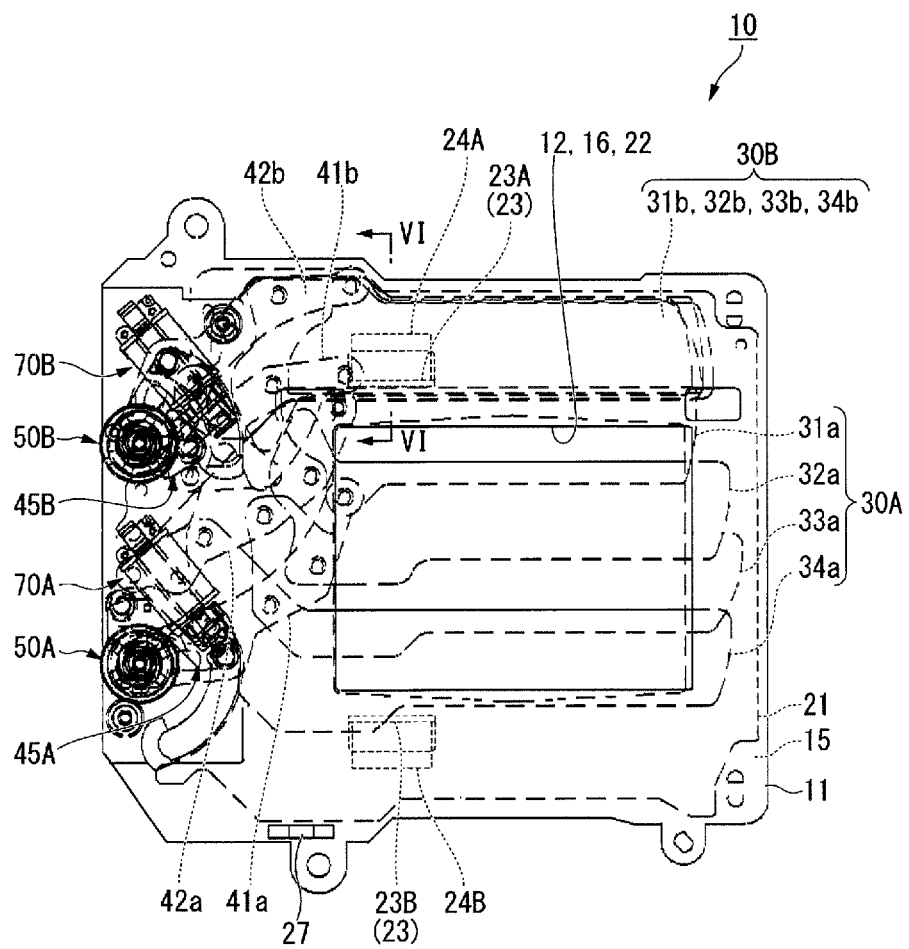
FIG. 3 is a front view of the blade drive device, showing an initial state.
Figure 4:
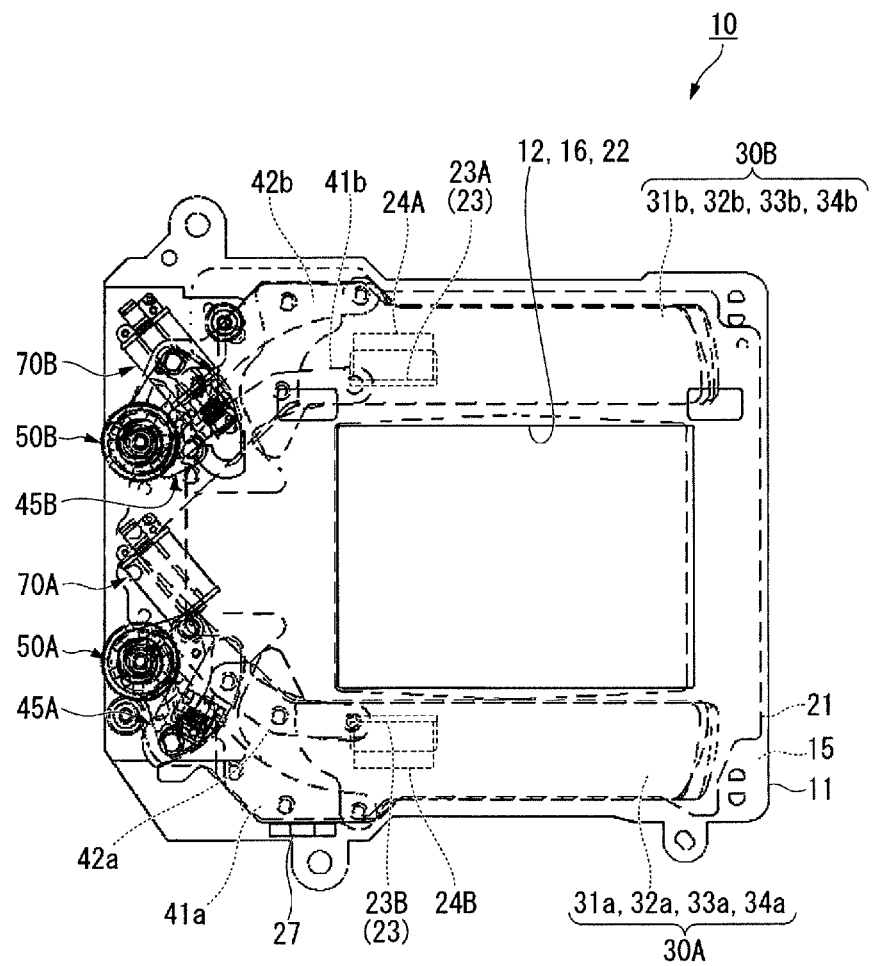
FIG. 4 is a front view of the blade drive device, showing a state during the exposure.
Figure 5:
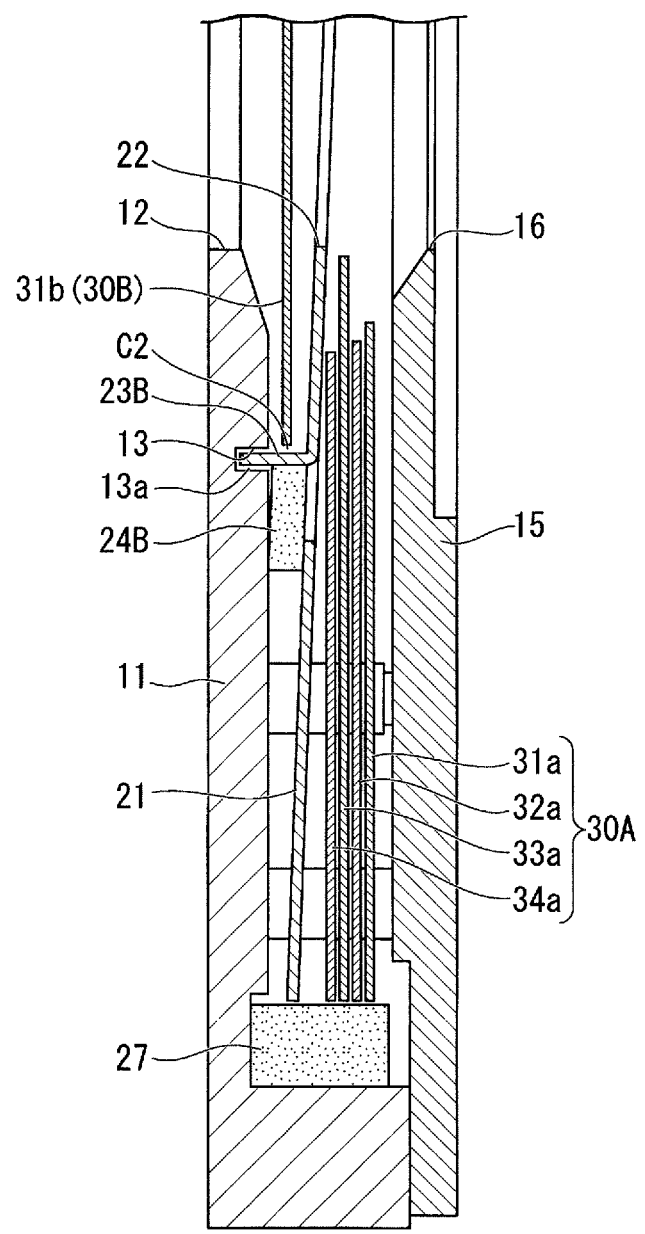
FIG. 5 is a cross-sectional view taken along V-V line of FIG. 2.
Figure 6:
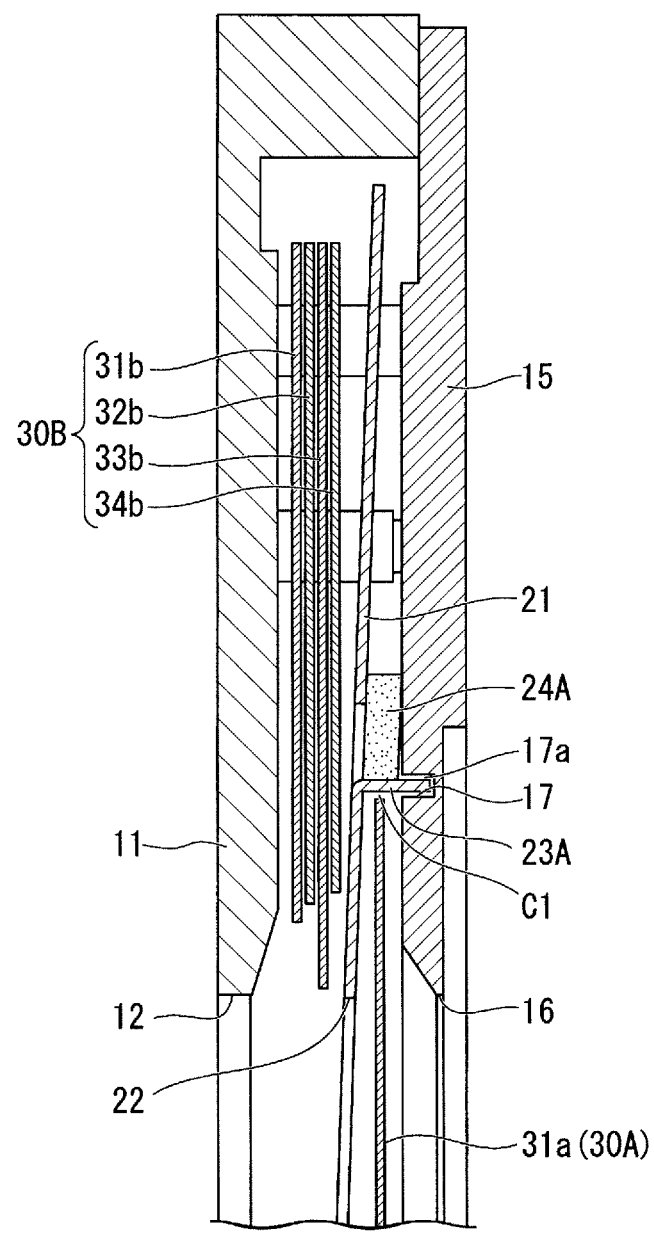
FIG. 6 is a cross-sectional view taken along VI-VI line of FIG. 3.

The optical apparatus 1 has a lens and so on for adjusting a focal length, though not shown in FIG. 1.
(Blade Drive Device)
FIG. 2 to FIG. 4 are front views of the blade drive device, in which FIG. 2 shows a state just after an exposure is completed, FIG. 3 shows an initial state (charging state) and FIG. 4 shows a state during the exposure. FIG. 5 is a cross-sectional view taken along V-V line of FIG. 2. FIG. 6 is a cross-sectional view taken along VI-VI line of FIG. 3.

The blade drive device 10 is a so-called focal plane shutter. As shown in FIG. 2 to FIG. 4, the blade drive device 10 includes a base plate 11 (corresponding to a "substrate" in claims), a support plate 15 (corresponding to a "substrate" in claims), a partition plate 21, blades 31a to 34a, 31b to 34b, drive arms 41a, 42a, 41b and 42b and electromagnets 70A and 70B.

As shown in FIG. 2, the base plate 11 is made of a synthetic resin, having a rectangular opening 12. The base plate 11 is a member arranged closest to a lens of the optical apparatus 1 in the blade drive device 10.

The support plate 15 is arranged in the back of the base plate 11 along the base plate 11 (see FIG. 5). The support plate 15 is made of a synthetic resin, having a rectangular opening 16. The opening 16 of the support plate 15 is formed so as to almost correspond to the opening 12 of the base plate 11 in plan view.

The partition plate 21 is arranged between the base plate 11 and the support plate 15 so as to extend along the base plate 11 and the support plate 15 (see FIG. 5). The partition plate 21 is made of a synthetic resin such as PET (polyethylene terephthalate), which is formed to be slightly smaller than the base plate 11 and the support plate 15 in plan view. The partition plate 21 has a rectangular opening 22. The opening 22 of the partition plate 21 is formed so as to almost correspond to the opening 12 of the base plate 11 and the opening 16 of the support plate 15 in plan view.

The blades 31a to 34a, 31b to 34b are expanded in a state where the openings 12, 16 and 22 are closed and overlap in a state where the openings 12, 16 and 22 are opened (see FIG. 2 to FIG. 4). The blades 31a to 34a, 31b to 34b are made of a synthetic resin and formed to be thin. The material of the blades 31a to 34a, 31b to 34b preferably has the same hardness as the partition plate 21, and is preferably the same as the material of the partition plate 21. The drive arms 41a, 42a, 41b and 42b are formed of metal thin plates for maintaining the strength. The blades 31a to 34a, 31b to 34b move between a position where the blades recede from the openings 12, 16 and 22 and a position where the blades overlap with at least part of the openings 12, 16 and 22.

Four pieces of blades 31a to 34a form a front curtain 30A. The front curtain 30A is arranged between the support plate 15 and the partition plate 21 (see FIG. 5). Four pieces of blades 31b to 34b form a rear curtain 30B. The rear curtain 30B is arranged between the base plate 11 and the partition plate 21 (see FIG. 6). FIG. 2 shows a state where the front curtain 30A is in the overlapping state and the rear curtain 30B is in the expanded state. In the case of FIG. 2, the front curtain 30A recedes from the openings 12, 16 and 22 and the rear curtain 30B closes the openings 12, 16 and 22.

Figure 7:
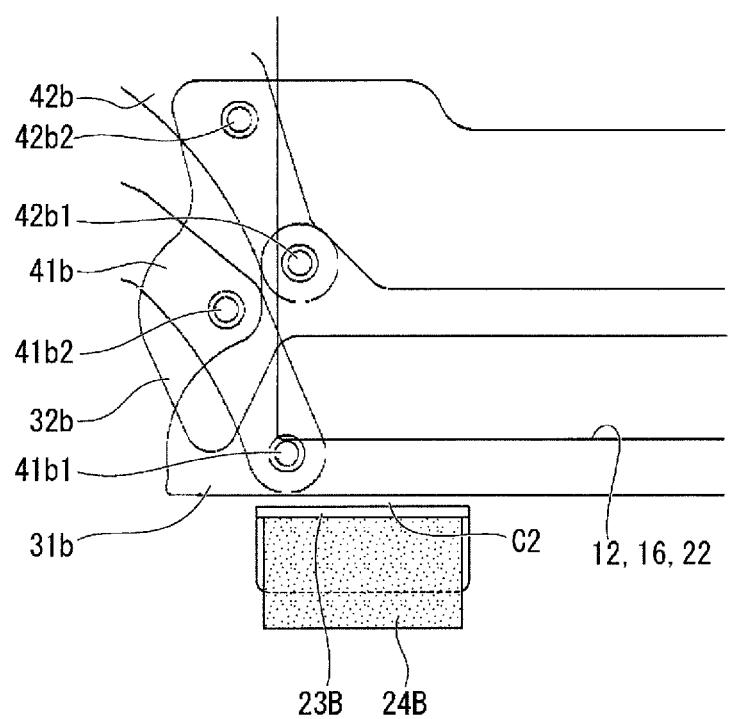
FIG. 7 is an enlarged plan view of the blade drive device.

FIG. 7 is an enlarged view of the blade drive device, which is the enlarged view in the vicinity of a second regulating portion 23B in the state shown in FIG. 2.

The front curtain 30A is connected to the drive arms 41a, 42a. The rear curtain 30B is connected to the drive arms 41b, 42b. More specifically, as shown in FIG. 7, the blade 31b is rotatably connected to the drive arm 41b by a connecting portion 41b1 and is rotatably connected to the drive arm 42b by a connecting portion 42b1. The blade 31b and the drive arms 41b, 42b function as a parallel link mechanism. The connecting portions 41b1, 42b1 are respectively provided at tip end sides of the drive arms 41b, 42b. The blade 32b is rotatably connected to the drive arm 41b by a connecting portion 41b2 and is rotatably connected to the drive arm 42b by a connecting portion 42b2 in the same manner as the blade 31b. As shown in FIG. 2, other blades 33b, 34b are also connected to the drive arms 41b, 42b by the same structure. These connecting portions 41b1, 41b2, 42b1 and 42b2 are respectively caulking pins. The connecting between the front curtain 30A and the drive arms 41a, 42a is the same as the connection between the rear curtain 30B and the drive arms 41b, 42b. These drive arms 41a, 42a, 41b and 42b are slidably supported by the base plate 11.

The base plate 11 is provided with a front curtain drive lever 45A and a rear curtain drive lever 45B for respectively driving the drive arms 41a, 42b. The front curtain drive lever 45A and the rear curtain drive lever 45B are supported by the base plate 11 so as to swing in a given range. In more detail, the front curtain drive lever 45A is supported so as to swing around an axis formed in the base plate 11, and a swinging range is prescribed by a groove formed in the base plate 11. The same applies to the rear curtain drive lever 45B.

The drive arm 41a is connected to the front curtain drive lever 45A. The drive arm 42b is connected to the rear curtain drive lever 45B. When the front curtain drive lever 45A swings, the drive arm 41a swings, then, the front curtain 30A moves accordingly. Similarly, when the rear curtain drive lever 45B swings, the drive arm 42b swings, then, the rear curtain 30B moves accordingly.

The front curtain drive lever 45A and the rear curtain drive lever 45B respectively hold iron pieces. The front curtain drive lever 45A can swing between a position where the iron piece abuts on the electromagnet 70A and a position where the iron piece recedes from the electromagnet 70A. The same applies to the rear curtain drive lever 45B.

The front curtain drive lever 45A is biased in a direction away from the electromagnet 70A by a not-shown spring. Similarly, the rear curtain drive lever 45B is biased in a direction away from the electromagnet 70B by a not-shown spring.

Ratchet wheels 50A, 50B are engaged with the front curtain drive lever 45A and the rear curtain drive lever 45B through the above-described springs. One end of the spring biasing the front curtain drive lever 45A in the direction away from the electromagnet 70A is engaged with the ratchet wheel 50A, and the other end of the spring is engaged with the front curtain drive lever 45A. The biasing force of the spring can be adjusted by adjusting the rotation amount of the ratchet wheel 50A. The ratchet wheel 50B also has the same function as the ratchet wheel 50A.

The electromagnet 70A can adsorb the iron piece of the front curtain drive lever 45A when the power is applied. Similarly, the electromagnet 70B can also adsorb the iron piece of the rear curtain drive lever 45B when the power is applied.

Here, a first regulating portion 23A and the second regulating portion 23B (hereinafter can be also referred to as "respective regulating portions 23") are integrally formed in the partition plate 21.

The first regulating portion 23A is provided to stand by being cut and raised from the partition plate 21 toward the support plate 15 in the opposite position of the front curtain 30A in the overlapping state with the opening 22 interposed therebetween. As shown in FIG. 6, the first regulating portion 23A is formed so that a plane direction thereof is orthogonal to a moving direction of the front curtain 30A. A prescribed clearance C1 is set between the first regulating portion 23A and the blade 31a of the front curtain 30A in the expanded state. A tip of the first regulating portion 23A is inserted into a guide hole 17 formed in the support plate 15. In this case, a gap 17a is provided between the first regulating portion 23A and the guide hole 17. The first regulating portion 23A has a first cushioning member 24A in a side surface (hereinafter referred to as a "back surface") which is the opposite side of the front curtain 30A. The first cushioning member 24A is a member having elasticity, which is made of, for example, a spongy synthetic resin, rubber and so on. The first cushioning member 24A is adhered and fixed to the back surface of the first regulating portion 23A and one principal surface of the partition plate 21 by, for example, a double faced tape and so on.

As shown in FIG. 3, the second regulating portion 23B is provided to stand by being cut and raised from the partition plate 21 toward the base plate 11 in the opposite position of the rear curtain 30B in the overlapping state with the opening 22 interposed therebetween. As shown in FIG. 5, the second regulating portion 23B is formed so that a plane direction thereof is orthogonal to a moving direction of the rear curtain 30B. A prescribed clearance C2 is set between the second regulating portion 23B and the blade 31b of the rear curtain 30B in the expanded state. A tip of the second regulating portion 23B is inserted into a guide hole 13 formed in the base plate 11. In this case, a gap 13a is provided between the second regulating portion 23B and the guide hole 13. The second regulating portion 23B has a second cushioning member 24B in a side surface (hereinafter referred to as a "back surface") which is the opposite side of the rear curtain 30B. The second cushioning member 24B is a member having elasticity, which is made of, for example, the spongy synthetic resin, rubber and so on in the same manner as the first cushioning member 24A. The second cushioning member 24B is adhered and fixed to the back surface of the second regulating portion 23B and the other principal surface of the partition plate 21 by, for example, the double faced tape and so on.

Furthermore, as shown in FIG. 2, a third cushioning member 27 is arranged in the opposite position of the opening 22 with the front curtain 30A in the overlapping state interposed therebetween. The third cushioning member 27 is a member having elasticity, which is made of, for example, rubber and so on. The third cushioning member 27 is arranged apart from the partition plate 21, which is housed between the base plate 11 and the support plate 15.

The first regulating portion 23A, the second regulating portion 23B and the third cushioning member 27 respectively function as stoppers for the front curtain 30A and the rear curtain 30B, which will be described later in detail.

Next, the operation of the blade drive device 10 will be explained.

As shown in FIG. 3, in the blade drive device 10, a not-shown setting lever is fixed in an initial position in the initial state, the front curtain 30A is expanded and closes the openings 12, 16 and 22, and the rear curtain 30B overlaps and recedes from the openings 12, 16 and 22. In this initial state, the iron pieces of the front curtain drive lever 45A and the rear curtain drive lever 45B respectively set in the initial position where the iron pieces abut on the electromagnets 70A, 70B and can be adsorbed on the electromagnets 70A, 70B.

At the time of imaging, when a release button of the optical apparatus 1 is pressed, the power is applied to coils of the electromagnet 70A, 70B, and the iron piece of the front curtain drive lever 45A is adsorbed on the electromagnet 70A and the iron piece of the rear curtain drive lever 45B is adsorbed on the electromagnet 70B. After that, the setting lever retreats from the front curtain drive lever 45A and the rear curtain drive lever 45B. Here, the front curtain drive lever 45A and the rear curtain drive lever 45B are held in a state of being adsorbed on the electromagnets 70A and 70B respectively.

After that, when the power application with respect to the coil of the electromagnet 70A is cut off, the front curtain drive lever 45A rotates in a clockwise direction in accordance with the biasing force of the spring as shown in FIG. 4. Accordingly, the front curtain 30A recedes from the openings 12, 16 and 22 to become in the overlapping state.

Moreover, the power application to the coil of the electromagnet 70B is maintained for a given period of time, and the rear curtain 30B is maintained in the state of retreating from the openings 12, 16 and 22. Accordingly, the openings 12, 16 and 22 are in an opened state (exposed state).

The front curtain 30A recedes from the openings 12, 16 and 22 and abuts on the third cushioning member 27. The swinging range of the front curtain drive lever 45A is prescribed by the groove formed in the base plate 11, into which the front curtain drive lever 45A is inserted. Accordingly, when the front curtain drive lever 45A abuts on an end portion of the groove in the case where the front curtain drive lever 45A rotates in accordance with the biasing force of the spring, the front curtain 30A may overrun in accordance with the law of inertia. However, the front curtain 30A abuts on the third cushioning member 27 at the end of the moving range of the front curtain 30A. Accordingly, the overrun of the front curtain 30A is suppressed.

After a given period of time has passed from the time when the release button is pressed, the power application to the coil of the electromagnet 70B is cut off, and the rear curtain drive lever 45B rotates in the clockwise direction by the biasing force of the spring. Accordingly, the rear curtain 30B is expanded and closes the openings 12, 16 and 22 as shown in FIG. 2. At this time, when the rear curtain drive lever 45B abuts on an end portion of the groove formed in the base plate 11, into which the rear curtain drive lever 45B is inserted, the blade 31b positioned at the head of the rear curtain 30B in the moving direction may overrun in accordance with the law of inertia. However, the blade 31b abuts on the second regulating portion 23B at the end of the moving range of the rear curtain 30B. Accordingly, the overrun of the blade 31b is suppressed. Furthermore, the second regulating portion 23B is provided with the gap 13a with respect to the guide hole 13 as well as includes the second cushioning member 24B in the back surface as shown in FIG. 5. Accordingly, the second regulating portion 23B can bent and deformed in the range of the gap 13a when receiving an impulsive force from the blade 31b and can gradually absorb the impulsive force by the second cushioning member 24B. As the blade 31b converges to a given position without bounding when abutting on the second regulating portion 23B, it is possible to prevent a part of the openings 12, 16 and 22 from opening, which leads to the abnormal exposure of the optical apparatus 1. One imaging is completed as described above. Furthermore, as the clearance C2 is provided between the second regulating portion 23B and the blade 31b in the expanded state, the blade 31b expanded and remaining still does not slidingly contact the second regulating portion 23B, which can prevent abrasion.

Next, the front curtain drive lever 45A and the rear curtain drive lever 45B are rotated in a counterclockwise direction by the not-shown setting lever. Accordingly, the front curtain 30A is expanded and closes the openings 12, 16 and 22, and the rear curtain 30B overlaps and recedes from the openings 12, 16 and 22 to be returned to the initial state shown in FIG. 3. At this time, when the front curtain drive lever 45A abuts on the end portion of the groove formed in the base plate 11, into which the front curtain drive lever 45A is inserted, the blade 31a positioned at the head of the front curtain 30A in the moving direction may overrun in accordance with the law of inertia. However, the blade 31a abuts on the first regulating portion 23A at the end of the moving range of the front curtain 30A. Accordingly, the overrun of the blade 31a is suppressed. Furthermore, the first regulating portion 23A is provided with the gap 17a with respect to the guide hole 17 as well as includes the first cushioning member 24A in the back surface. Accordingly, the blade 31a converges to a given position without bounding when abutting on the second regulating portion 23B due to the same reason as the relation between the blade 31b and the second regulating portion 23B.

As described above, the blade drive device 10 according to the embodiment includes the partition plate 21 having the opening 22, the blades 31a to 34a, 31b to 34b which are expanded in the state where the opening 22 is closed and which overlap one another in the state where the opening 22 is opened and respective regulating portions 23 integrally formed with the partition plate 21, on which the blades 31a, 31b abut when being expanded.

According to the structure, the blades 31a, 31b abut on respective regulating portions 23 in the expanded state, therefore, it is possible to prevent the blades 31a, 31b from overrunning and bounding at the end position of movement when the blades 31a, 31b are expanded. Additionally, as respective regulating portions 23 are integrally formed with the partition plate 21, the above effects can be obtained without increasing the number of components. Therefore, the blade drive device 10 capable of suppressing the increase in the number of components while suppressing the bounding to the blades 31a, 31b.

The running speed of the blades in the rear curtain 30B is faster than that in the front curtain 30A in the transition from the overlapping state to the expanded state, therefore, the rear curtain 30B tends to bound easily. The second regulating portion 23B is provided with respect to the rear curtain 30B in the embodiment, the blade drive device 10 in which the bounding of blades hardly occurs can be obtained.

Furthermore, respective regulating portions 23 are provided to stand by cutting and raising the partition plate 21, therefore, respective regulating portions 23 can be easily formed.

In the embodiment, the guide hole 13 into which the second regulating portion 23B is inserted is formed in the base plate 11, and the guide hole 17 into which the first regulating portion 23A is inserted is formed in the support plate 15. Furthermore, the gaps 13a, 17a are provided between respective regulating portions 23 and the guide holes 13, 17.

According to the structure, accurate positions of respective regulating portions 23 can be prescribed by inserting respective regulating portions 23 into the guide holes 13, 17 at the time of assembling the blade drive device 10, therefore, the assembling property can be improved. Additionally, as the gaps 13a, 17a are provided between respective regulating portions 23 and the guide holes 13, 17, respective regulating portions 23 are bent and deformed when the blades 31a, 31b collide with respective regulating portions 23. Accordingly, the impulsive force due to the collision of the blades 31a, 31b can be efficiently absorbed. Therefore, the bounding of the blades 31a, 31b can be positively suppressed.

The hardness of respective regulating portions 23 are approximately the same as the hardness of the blades 31a to 34a, 31b to 34b, therefore, the generation of dust such as abrasion powder or fragments can be suppressed when respective regulating portions 23 abut on the blades 31a, 31b.

The first regulating portion 23A has the first cushioning member 24A in the back surface, and the second regulating portion 23B has the second cushioning member 24B in the back surface. Accordingly, when the blades 31a, 31b abut on respective regulating portions 23, the impulsive force due to the collision of the blades 31a, 31b can be efficiently absorbed. Additionally, as the blades 31a, 31b do not directly contact the first cushioning member 24A and the second cushioning member 24B, it is possible to suppress the generation of dust such as abrasion powder or fragments caused by the first cushioning member 24A and the second cushioning member 24B. Therefore, the bounding of the blades 31a, 31b can be positively suppressed while suppressing the generation of dust.

As the optical apparatus 1 according to the embodiment includes the above blade drive device 10, the bounding of the blades 31a, 31b is suppressed and the increase in the number of components is suppressed.

The present invention is not limited to the above embodiment explained with reference to the drawings, and various modification examples may be considered within a technical scope thereof.

For example, the first cushioning member 24A and the second cushioning member 24B are adhered to the back surfaces of respective regulating portions 23 and the principal surface of the partition plate 21 in the above embodiment. However, the present invention is not limited to this, and the first cushioning member and the second cushioning member may be interposed, for example, between the back surfaces of respective regulating portions 23 and the guide holes 13, 17.

Also in the above embodiment, the blade drive device 10 does not have a cushioning member abutting on the rear curtain 30B in the overlapping state. However, the present invention is not limited to this, and the blade drive device may include the cushioning member abutting on the rear curtain 30B in the overlapping state in the opposite position of the opening 22 with the rear curtain 30B in the overlapping state interposed therebetween in plan view. Furthermore, the cushioning member may have the structure of respective regulating portions 23.

Although the partition plate 21 is made of a synthetic resin in the above embodiment, the partition plate 21 may be made of a metal such as aluminum, which has hardness enough to prevent the blades 31a, 31b from being scratched or from being deformed when the blades 31a, 31b are in the expanded state and about on the partition plate 21. As respective regulating portions 23 are provided to stand by cutting and raising the partition plate 21 as long as they are made of metal, the processing is easy.

Furthermore, it is possible to appropriately replace the components of the above embodiment with well-known components within a scope not departing from the gist of the present invention.

What is claimed is:

1. A blade drive device comprising:
a partition plate having an opening and being extensive between a base plate of the blade drive device and a support plate of the blade drive device, wherein the partition plate creates a layer of first space between the partition plate and the base plate, and a layer of second space between the partition plate and the support plate;
a set of blades arranged in an overlapping matter in a thickness direction of the blade drive device and stored in one of the first and second spaces, wherein the set of blades are operable in the one of the first and second spaces to deploy to first positions where the set of blades reduces their overlapping areas among them to close the opening and retract to second positions where the set of blades increases their overlapping areas among them to open the opening, and the set of blades includes a leading blade being deployed ahead of a rest of the blades in the set; and
a regulating portion integrally formed on the partition plate and positioned to come in abutment with the leading blade overrunning its first position upon arrival of the leading blade at the first position from the second position, wherein one of the base plate and the support plate is formed with a guide hole through which the regulating portion is inserted with a clearance formed between the regulating portion and an inner peripheral of the guide hole.

2. The blade drive device according to claim 1, wherein the regulating portion is provided with a first end and a second end in the thickness direction, wherein the second end is fixed to the partition plate so that the regulating portion stands from the partition plate.

3. The blade drive device according to claim 1, wherein the set of blades constitutes a rear curtain.

4. The blade drive device according to claim 1, wherein the regulating portions is made of a material nearly as hard as a material of which the blades are made.

5. The blade drive device according to claim 1, wherein the regulating portion comprises a cushioning member forming a side of the regulating portion opposite to the side of the regulating portion coming in abutment with the leading blade.

6. An optical apparatus comprising the blade drive device according to claim 1.

7. The blade drive device according to claim 1, wherein the regulating portion is positioned to stand clear of the leading blade being settled at the first position by a clearance, which is narrow enough for the regulating potion to come in abutment with the leading blade overrunning its first position upon arrival of the leasing blade at the first position from the second position.

8. The blade drive device according to claim 1, further comprising:
a second set of blades arranged in an overlapping matter in a thickness direction of the blade drive device and stored in the other of the first and second spaces, wherein the second set of blades are operable in the other of the first and second spaces to deploy to third positions where the second set of blades reduces their overlapping areas among them to close the opening and retract to fourth positions where the second set of blades increases their overlapping areas among them to open the opening, and the second set of blades includes a second leading blade being deployed ahead of a rest of the blades in the second set; and
a second regulating portion integrally formed on a side of the partition plate opposite to the side on which the regulating portion is integrally formed and positioned to come in abutment with the second leading blade overrunning its third position upon arrival of the second leading blade at the third position from the fourth position.

9. The blade drive device according to claim 8, wherein the second regulating portion is provided with a first end and a second end in the thickness direction, wherein the second end is fixed to the partition plate so that the second regulating portion stands from the partition plate.

10. The blade drive device according to claim 9, wherein the other of the base plate and the support plate is formed with a second guide hole into which the first end of the second regulating portion is inserted with a clearance formed between the first end of the second regulating portion and an inner peripheral of the second guide hole.

11. The blade drive device according to claim 8, wherein the second set of blades constitutes a front curtain.

12. The blade drive device according to claim 8, wherein the second regulating portion is made of a material as hard as a material of which the blades are made.

13. The blade drive device according to claim 8, wherein the second regulating portion comprises a second cushioning member forming a side of the second regulating portion opposite to the side of the regulating portion coming in abutment with the second leading blade.

14. The blade drive device according to claim 8, wherein the second regulating portion is positioned to stand clear of the second leading blade being settled at its third position by a clearance, which is narrow enough for the second regulating potion to come in abutment with the second leading blade overrunning its third position upon arrival of the second leading blade at the third position from the fourth position.

* * * * *